United States Patent Office 3,505,329
Patented Apr. 7, 1970

3,505,329
PROCESS FOR THE SYNTHESIS OF BIOPTERIN
Joseph Weinstock, Phoenixville, Pa., assignor to Smith Kline & French Laboratories, Philadelphia, Pa., a corporation of Pennsylvania
No Drawing. Filed Feb. 6, 1968, Ser. No. 703,251
Int. Cl. C07d 57/28
U.S. Cl. 260—251.5           5 Claims

ABSTRACT OF THE DISCLOSURE

Biopterin is synthesized by reacting 2,4,5-triamino-6-hydroxypyrimidine with 5-deoxy-L-arabinosone in aqueous solution at pH of about 7.5 to 10, acidifying and then recrystallizing by dissolving in basic solution and precipitating with acid. 5-deoxy-L-arabinosone is prepared by oxidizing 5-deoxy-L-arabinose, which is prepared from L-rhamnose, using cupric acetate.

---

This invention relates to a new process for the synthesis of biopterin.

Biopterin, which is 2-amino-4-hydroxy-6-[1,2-dihydroxypropyl-(L-erythro)]pteridine, is a growth factor for *Crithidia fasciculata* [Patterson et al., J. Am. Chem. Soc., 78:5871–5873 (1956)]. Biopterin also promotes weight gain of poultry, for example, feeding poultry a ration to which biopterin is added in an amount of about 10 to 100 mg. per 100 pounds of feed produces an increase in weight gain of the poultry.

In addition, bioterin is an article of commerce, for example a practical grade of biopterin is offered for sale in one gram quantities by General Biochemicals, Chagrin Falls, Ohio.

According to the known methods for synthesizing biopterin, 2,4,5-triamino-6-hydroxypyrimidine is reacted with 5-deoxy-L-arabinose in acid medium in the presence of hydrazine; Rembold et al., Chem. Ber., 96:1395–1405 (1963). However, this reaction produces a mixture of many compounds from which biopterin is extracted in low yield after laborious and complex purification procedures. The yield of biopterin by this method, reported by Rembold et al., Chem. Ber., 96:1395–1405 (1963) at p. 1402, varied according to the particular reaction conditions from 3.5 to 7% based on the triamino-hydroxypyrimidine sulfate starting material.

By the process of the present invention, biopterin is synthesized in improved yield and contaminated only with the corresponding 7-isomer, that is 2-amino-4-hydroxy-7-[1,2-dihydroxypropyl-(L-erythro)]pteridine, which will be designated herein as 7-biopterin, in a mixture containing about 80% biopterin and 20% 7-biopterin. For most purposes, this material is suitable and further purification is not necessary. However, pure biopterin may be obtained from this 80% biopterin-20% 7-biopterin mixture by chromatography, for example by the procedure described by Rembold et al., Chem. Ber. 96:1395–1405 (1963).

According to one aspect of this invention, biopterin is synthesized by reacting 2,4,5-triamino-6-hydroxypyrimidine with 5-deoxy-L-arabinosone in aqueous solution at pH of about 7.5 to 10, acidifying and then recrystallizing by dissolving in basic solution and precipitating with acid. Conveniently, the pyrimidine starting material is used in the form of a salt, such as 2,4,5-triamino-6-hydroxypyrimidine sulfate or hydrochloride. The reaction is carried out in aqueous solution at pH of about 7.5 to 10, preferably at pH of about 8 to 9, which is obtained by adding a suitable base such as sodium carbonate, sodium bicarbonate, sodium hydroxide or, preferably, aqueous ammonia. Conveniently, the reaction is carried out by stirring at about room temperature for about 1–3 hours. The reaction mixture is then acidified to pH of about 4 to 5 using, for example, hydrochloric acid and/or glacial acetic acid. The solid material is then filtered off and dried and recrystallized by dissolving in basic solution, such as aqueous ammonium hydroxide, and then adding acid, such as glacial acetic acid, to precipitate the product.

Purification by recrystallization as described above gives a product which is 80% biopterin and 20% 7-biopterin.

According to another aspect of this invention, biopterin is prepared by oxidizing 5-deoxy-L-arabinose using cupric acetate to give 5-deoxy-L-arabinosone and reacting the thus prepared 5-deoxy-L-arabinosone with 2,4,5-triamino-6-hydroxypyrimidine as described hereabove. The oxidation of 5-deoxy-L-arabinose is carried out preferably in a lower alkanol solvent, advantageously methanol, at elevated temperature, conveniently, at the reflux temperature of the solvent. Removing the precipitated copper by filtration, then adding anhydrous hydrogen sulfide and filtering gives a solution containing 5-deoxy-L-arbinosone. The solution is concentrated to a small volume and is used in the above described reaction with 2,4,5-triamino-6-hydroxypyrimidine to prepare biopterin.

5-deoxy-L-arabinose is prepared from L-rhamnose by the following procedure:

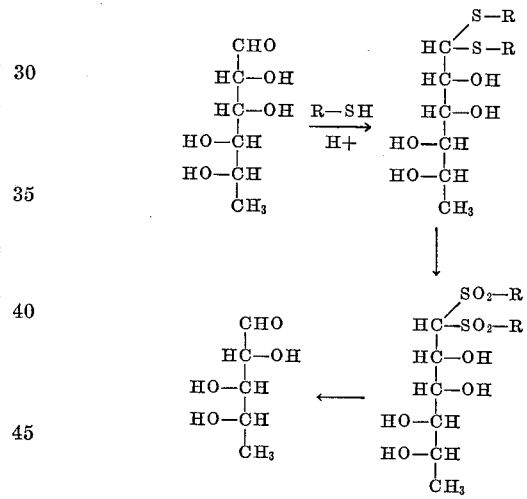

By the above procedure, L-rhamnose in acid solution is treated with at least two molar equivalents of a lower alkyl mercaptan, preferably ethyl mercaptan. The resulting 1,1-di-(lower alkylthio)-L-rhamnose is oxidized using, for example, peracetic acid. The reaction is conveniently carried out in a lower alkanol solvent, such as methanol, at room temperature to give 1,1-di-(lower alkylsulfonyl)-L-rhamnose. Treating this intermediate with aqueous ammonia and filtering off the resulting di-(lower alkylsulfonyl)methane gives a basic aqueous solution of 5-deoxy-L-arabinose. This solution is concentrated and the 5-deoxy-L-arabinose is used as described hereabove to prepare biopterin.

The following example illustrates the process of this invention.

EXAMPLE

A mixture of 199 g. of L-rhamnose and 210 ml. of concentrated hydrochloric acid is stirred and chilled to 5–10° C. Ethyl mercaptan (200 g.) is added dropwise over a period of 1.5–2 hours. The reaction mixture is then stirred for an additional 15 minutes and then is allowed to stand at room temperature for 1.5 hours. The reaction mixture is stirred and cooled to 10° C. and filtered in vacuo. The solid material thus obtained is washed with ice-cold water and dried to give 1,1-di-(ethylthio)-L-rhamnose.

A mixture of 175.5 g. of 1,1-di-(ethylthio)-L-rhamnose and 1170 ml. of methanol is stirred and 507 ml. of 40% solution of peracetic acid is added dropwise over a period of 2.25 hours, while maintaining the reaction temperature at 20°–25° C. The reaction mixture is then stirred for an additional two hours and the methanol is removed in vacuo. The residue is diluted with anhydrous ether and the solid material filtered off and dried to give 1,1-di-(ethylsulfonyl)-L-rhamnose.

A suspension of 66.8 g. of 1,1-di-(ethylsulfonyl)-L-rhamnose in 700 ml. of water is brought to pH 8.5–9.0 by addition of 10 drops of 28% ammonium hydroxide. The resulting mixture is stirred for 30 minutes, then cooled in an ice bath for an additional 30 minutes. The white solid is removed by filtration. The filtrate which contains 5-deoxy-L-arabinose is concentrated to a small volume, then dissolved in two liters of methanol. Cupric acetate monohydrate (150 g.) is added and the resulting mixture is heated under reflux for 30 minutes, then the precipitated copper is removed by filtration and washed with fresh methanol. The excess copper is precipitated with anhydrous hydrogen sulfide, charcoal is added and the solution is clarified by filtration. The solution is then concentrated to a small volume, cooled and basified to pH 8.5–9.0 by addition of 28% ammonium hydroxide to give a basic aqueous solution of 5-deoxy-L-arabinosone.

A solution containing 34.2 g. of 2,4,5-triamino-6-hydroxypyrimidine sulfate in 800 ml. of water is basified with aqueous ammonia to pH 8.5–9.0 at 50° C. and clarified by filtration. To this solution is added the above prepared basic aqueous solution of 5-deoxy-L-arabinosone. The resulting mixture is then stirred under nitrogen for 1.5 hours. The mixture is cooled, 10 drops of 5 N hydrochloric acid is added and the mixture is brought to pH 4.5–5.0 by adding glacial acetic acid. After additional cooling, the solid material is removed by filtration, washed with water and dried.

The yield of crude biopterin product is 82.6%. This material is recrystallized by dissolving it in three liters of aqueous ammonia to give a solution having a pH of 9, heating the solution to reflux, adding charcoal, filtering and then acidifying the filtrate to pH 4–5 with glacial acetic acid and filtering off the resulting precipitate at 55–60° C. This solid material is washed with water and dried in vacuo at 100° C., then dissolved in 2.5 liters of boiling water containing ammonia (pH 8.5–9). The solution is clarified by filtering and adjusted to pH 4–5 with glacial acetic acid. The resulting precipitate is filtered off at 55–60° C., washed with water and dried in vacuo at 100° C. to give a product (yield, 36.7% based on the pyrimidine sulfate starting material) which is 80% biopterin and 20% 7-biopterin.

What is claimed is:

1. A process for synthesizing biopterin which comprises reacting 2,4,5-triamino-6-hydroxypyrimidine with 5-deoxy-L-arabinosone in an aqueous solution at pH of about 7.5 to 10, acidifying and recrystallizing by dissolving in basic solution and precipitating with acid.

2. A process according to claim 1 in which the said pH is about 8 to 9.

3. A process according to claim 1 in which the said reaction of 2,4,5-triamino-6-hydroxypyrimidine with 5-deoxy-L-arabinosone is carried out at room temperature.

4. A process for synthesizing biopterin which comprises oxidizing in a lower alkanol solvent at the reflux temperature of said solvent 5-deoxy-L-arabinose using cupric acetate, reacting 2,4,5-triamino-6-hydroxypyrimidine with the resulting 5-deoxy-L-arabinosone in an aqueous solution at pH of about 7.5 to 10, acidifying and recrystallizing by dissolving in basic solution and precipitating with acid.

5. A process according to claim 4 in which the lower alkanol solvent is methanol.

References Cited

FOREIGN PATENTS 582,950   9/1959   Canada.

ANTON D. ROLLINS, Primary Examiner

R. V. RUSH, Assistant Examiner

U.S. Cl. X.R.

99—4; 260—999